United States Patent
Beristany et al.

(10) Patent No.: US 12,428,839 B2
(45) Date of Patent: Sep. 30, 2025

(54) BRACE FOR CEILING DROP

(71) Applicant: Hubbell Incorporated, Shelton, CT (US)

(72) Inventors: Victor Beristany, South Bend, IN (US); Krzysztof Korcz, Granger, IN (US); Krishna Patel, Granger, IN (US)

(73) Assignee: Hubbell Incorporated, Shelton, CT (US)

( * ) Notice: Subject to any disclaimer, the term of this patent is extended or adjusted under 35 U.S.C. 154(b) by 31 days.

(21) Appl. No.: 18/508,673

(22) Filed: Nov. 14, 2023

(65) Prior Publication Data

US 2024/0167276 A1 May 23, 2024

Related U.S. Application Data

(60) Provisional application No. 63/427,577, filed on Nov. 23, 2022.

(51) Int. Cl.
*H02G 3/12* (2006.01)
*E04B 9/00* (2006.01)
*H02G 3/20* (2006.01)

(52) U.S. Cl.
CPC ............... *E04B 9/006* (2013.01); *H02G 3/20* (2013.01)

(58) Field of Classification Search
CPC ........... E04B 9/006; H02G 3/20; H02G 3/125
See application file for complete search history.

(56) References Cited

U.S. PATENT DOCUMENTS

| | | |
|---|---|---|
| 2016/0308342 A1 | 10/2016 | Witherbee et al. |
| 2018/0251978 A1* | 9/2018 | Yaphe ........................ E04B 9/18 |
| 2019/0376544 A1 | 12/2019 | Davis |
| 2021/0083465 A1* | 3/2021 | Anderson ................ H02G 3/08 |
| 2021/0091551 A1 | 3/2021 | Anderson |
| 2021/0156512 A1 | 5/2021 | Wilson et al. |
| 2021/0281056 A1* | 9/2021 | Oh ........................... H02G 3/20 |

OTHER PUBLICATIONS

"Heavy Duty T-Grid Box Hanger, Mounting Clip," Product details, nVent CADDY. (2 pages).
"Fixture Box Kit for use on Suspended Ceilings," Product details, Arlington Industries, Inc. (2 pages).
International Search Report and Written Opinion issued on Apr. 4, 2024, by the International Searching Authority in corresponding International Patent Application No. PCT/US2023/079610. (17 pages).

* cited by examiner

*Primary Examiner* — Amy J. Sterling
(74) *Attorney, Agent, or Firm* — Robinson + Cole LLP

(57) ABSTRACT

A brace for mounting an electrical box between supports includes a central body with a pair of elongated sides each having a first end and a second end. The central body also includes a top surface connected between each first end. Rails are connected to each second end and extend substantially along the length of the pair of elongated sides. The brace also includes a first connecting end connected to a first end of the central body and a second connecting end connected to a second end of the central body. The central body, the first connecting end, and the second connecting end are integrally formed in a one-piece construction. Each rail is spaced apart from at least one of the first connecting end and the second connecting end to form a mounting space.

20 Claims, 11 Drawing Sheets

BRACE FOR CEILING DROP

CROSS-REFERENCE TO RELATED APPLICATION

This application claims priority to U.S. Provisional Patent Application No. 63/427,577, filed Nov. 23, 2022, the entire contents of which is incorporated herein by reference in its entirety.

FIELD

The present disclosure relates to a mounting brace assembly for an electrical box. More particularly, the present disclosure relates to a mounting brace shaped to allow for easy connection with a mounting bracket.

BACKGROUND

Ceiling fan and support braces for ceiling fans and luminaires are known for the support various outlet boxes. The braces are typically installed between supports such as trusses and joists in the ceiling or other overhead structures. Braces are also known for connecting to the bar supports used in suspended ceilings. Such braces can be awkward to install and may not provide the needed support for the intended device to be mounted to the electrical box.

SUMMARY

Various examples of the present disclosure can overcome various of the aforementioned and other disadvantages associated with known mounting assemblies and offer new advantages as well.

According to one aspect of various examples of the present disclosure there is provided a mounting brace for supporting an electrical box above a ceiling. The mounting bracket is formed with a one-piece construction.

According to one aspect of various examples of the present disclosure there is provided a mounting bracket for connecting to a mounting brace.

According to one aspect of various examples of the present disclosure there is provided a brace for mounting an electrical box between supports includes a central body with a pair of elongated sides each having a first end and a second end. The central body also includes a top surface connected between each first end. Rails are connected to each second end and extend substantially along the length of the pair of elongated sides. The brace also includes a first connecting end connected to a first end of the central body and a second connecting end connected to a second end of the central body. The central body, the first connecting end, and the second connecting end are integrally formed in a one-piece construction. Each rail is spaced apart from at least one of the first connecting end and the second connecting end to form a mounting space.

According to another aspect of various examples of the present disclosure, there is provided a bracket for mounting an electrical box to a brace that includes a base portion with a center, a first wing, and a second wing. A first side portion extends from the base portion. The first side portion includes a first end and a second end. The first wing portion is connected to the first side portion proximate to the first end and a first channel is formed between the first end of the first side portion and the first wing portion. A second side portion extends from the base portion and is spaced apart from the first side portion. The second side portion includes a first end and a second end. The first wing portion is connected to the first side portion proximate to the first end and a second channel is formed between the first end of the second side portion and the first wing portion.

According to another aspect of various examples of the present disclosure, there is provided a mounting assembly that includes a brace and a connection assembly. The brace includes a central body with a pair of elongated sides each having a first end and a second end, a top surface connected between each first end, and a rail connected to each second end and extending substantially along the length of the pair of elongated sides. The brace also includes a first connecting end connected to a first end of the central body and a second connecting end connected to a second end of the central body. Each rail is spaced apart from at least one of the first connecting end and the second connecting end to form a mounting space. The connection assembly includes a bracket with a base portion including a center and a first wing and a second wing, a first side portion, and a second side portion. The first side portion extends from the base portion. The first side portion includes a first end and a second end. The first wing portion is connected to the first side portion proximate to the first end and a first channel is formed between the first end of the first side portion and the first wing portion. The second side portion extends from the base portion and is spaced apart from the first side portion. The second side portion includes a first end and a second end. The first wing portion is connected to the first side portion proximate to the first end and a second channel is formed between the first end of the second side portion and the first wing portion. The first side portion and the second side portion are sized to be removably received within the mounting space. The first channel and the second channel are each configured to removably receive one of the rails, the bracket being selectively slidable along the rails.

According to another aspect of various examples of the present disclosure, there is provided a brace for mounting an electrical box between supports. The brace includes central body that has an elongated side extending between a first end and a second end. A catch extends from the elongated side. The brace further includes a first connecting end, a second connecting end, and a rail. The first connecting end is connected to the first end of the central body. The second connecting end is connected to the second end of the central body. The rail extends partially between the first connecting end and the second connecting end. The rail is spaced apart from at least one of the first connecting end and the second connecting end to form a mounting space configured to receive a bracket. The catch is disposed proximate to the mounting space and can limit movement of the bracket along a length of the central body.

According to another aspect of various examples of the present disclosure, there is provided a brace for mounting an electrical box between supports. The brace includes a central body extending along an elongated axis between a first end and a second end. The brace also includes a first rail and a second rail. The first rail extends substantially perpendicularly from the central body in a first direction perpendicularly to the elongated axis. The first rail extends along the elongated axis and is spaced apart from the second end to form a first mounting space. The second rail extends substantially perpendicularly from the central body is a second direction opposite to the first direction. The second rail extends along the elongated axis and is spaced apart from the second end to form a second mounting space. The brace is symmetrical along the elongated axis.

According to another aspect of various examples of the present disclosure, there is provided a bracket for mounting an electrical box to a brace. The bracket includes a base portion, a first concave portion, and a second concave portion. The base portion includes a center. The first concave portion is oriented relative to the center and forming a first channel. The second concave portion is disposed opposite to the first concave portion oriented relative to the center. The first concave portion and the second concave portion can receive a portion of the brace to permit slidable movement along the brace.

According to another aspect of various examples of the present disclosure, there is provided a bracket for mounting an electrical box to a brace. The bracket includes a concave base portion having a first base end and a second base end. The bracket also includes a first side portion and a second side portion. The first side portion has a first side end and second side end. The first base end is connected to the first side portion between the first side end and the second side end. A first channel is formed between the first side portion and the first base end. A second side portion has a third side end and a fourth side end. The second base end is connected to the second side portion between the third side end and the fourth side end. A second channel is formed between the second side portion and the second base end.

According to another aspect of various examples of the present disclosure, there is provided a mounting assembly. The mounting assembly includes a brace and a bracket. The brace includes central body that has an elongated side extending between a first end and a second end. A catch extends from the elongated side. The brace further includes a first connecting end, a second connecting end, and a rail. The first connecting end is connected to the first end of the central body. The second connecting end is connected to the second end of the central body. The rail extends partially between the first connecting end and the second connecting end. The rail is spaced apart from at least one of the first connecting end and the second connecting end to form a mounting space configured to receive a bracket. The catch is disposed proximate to the mounting space and can limit movement of the bracket along a length of the central body. The bracket includes a base portion, a first concave portion, and a second concave portion. The base portion includes a center. The first concave portion is oriented relative to the center and forming a first channel. The second concave portion is disposed opposite to the first concave portion oriented relative to the center. The first concave portion and the second concave portion can receive a portion of the brace to permit slidable movement along the brace.

According to another aspect of various examples of the present disclosure, there is provided a mounting assembly. The mounting assembly includes a brace and a bracket. The brace includes a central body extending along an elongated axis between a first end and a second end. The brace also includes a first rail and a second rail. The first rail extends substantially perpendicularly from the central body in a first direction perpendicularly to the elongated axis. The first rail extends along the elongated axis and is spaced apart from the second end to form a first mounting space. The second rail extends substantially perpendicularly from the central body is a second direction opposite to the first direction. The second rail extends along the elongated axis and is spaced apart from the second end to form a second mounting space. The brace is symmetrical along the elongated axis. The bracket includes a concave base portion having a first base end and a second base end. The bracket also includes a first side portion and a second side portion. The first side portion has a first side end and second side end. The first base end is connected to the first side portion between the first side end and the second side end. A first channel is formed between the first side portion and the first base end. A second side portion has a third side end and a fourth side end. The second base end is connected to the second side portion between the third side end and the fourth side end. A second channel is formed between the second side portion and the second base end.

The disclosure herein should become evident to a person of ordinary skill in the art given the following enabling description and drawings. The drawings are for illustration purposes only and are not drawn to scale unless otherwise indicated. The drawings are not intended to limit the scope of the invention. The following enabling disclosure is directed to one of ordinary skill in the art and presupposes that those aspects within the ability of the ordinarily skilled artisan are understood and appreciated.

BRIEF DESCRIPTION OF THE DRAWINGS

Various aspects and advantageous features of the present disclosure will become more apparent to those of ordinary skill when described in the detailed description of preferred examples and reference to the accompany drawings.

DETAILED DESCRIPTION

Figure 1:
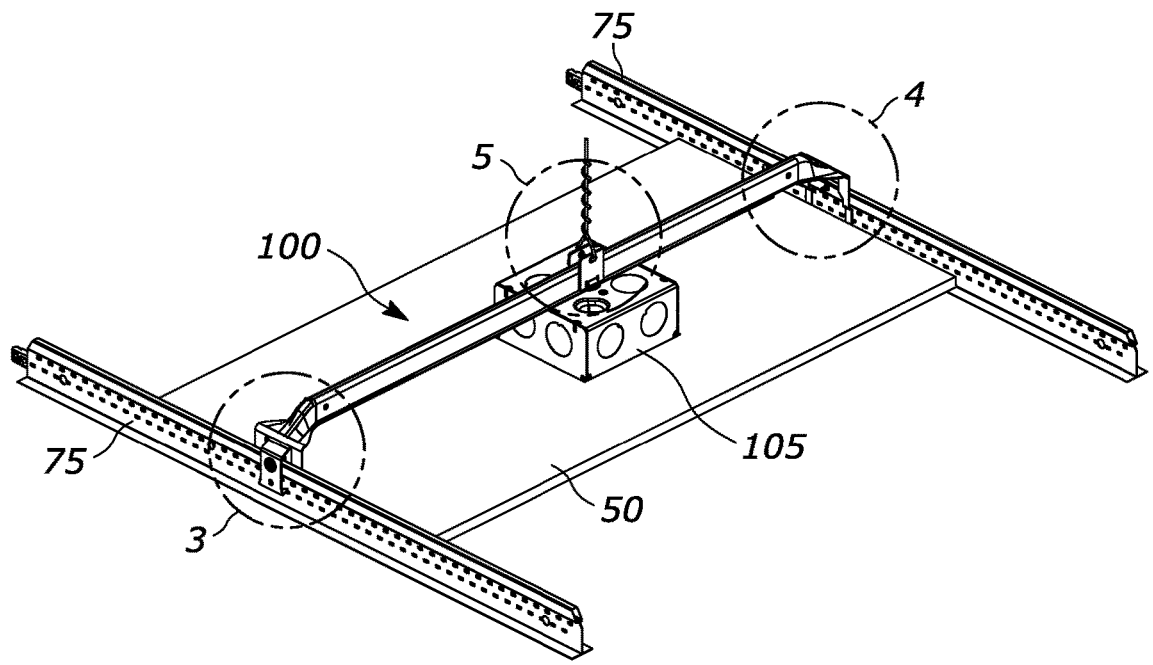
FIG. 1 shows a perspective view of a mounting brace supporting an electrical box and mounted to ceiling supports according to one example of the disclosure.

As shown in FIG. 1, a mounting brace 100 is installed in above ceiling 50 between a pair of ceiling supports 75. The mounting brace 100 is positioned so that it is substantially hidden to occupants in the room below. The mounting brace 100 supports an electrical box 105 that may be positioned proximate to an opening in the ceiling so that it can be at least partially visible in the room below.

Figure 6:
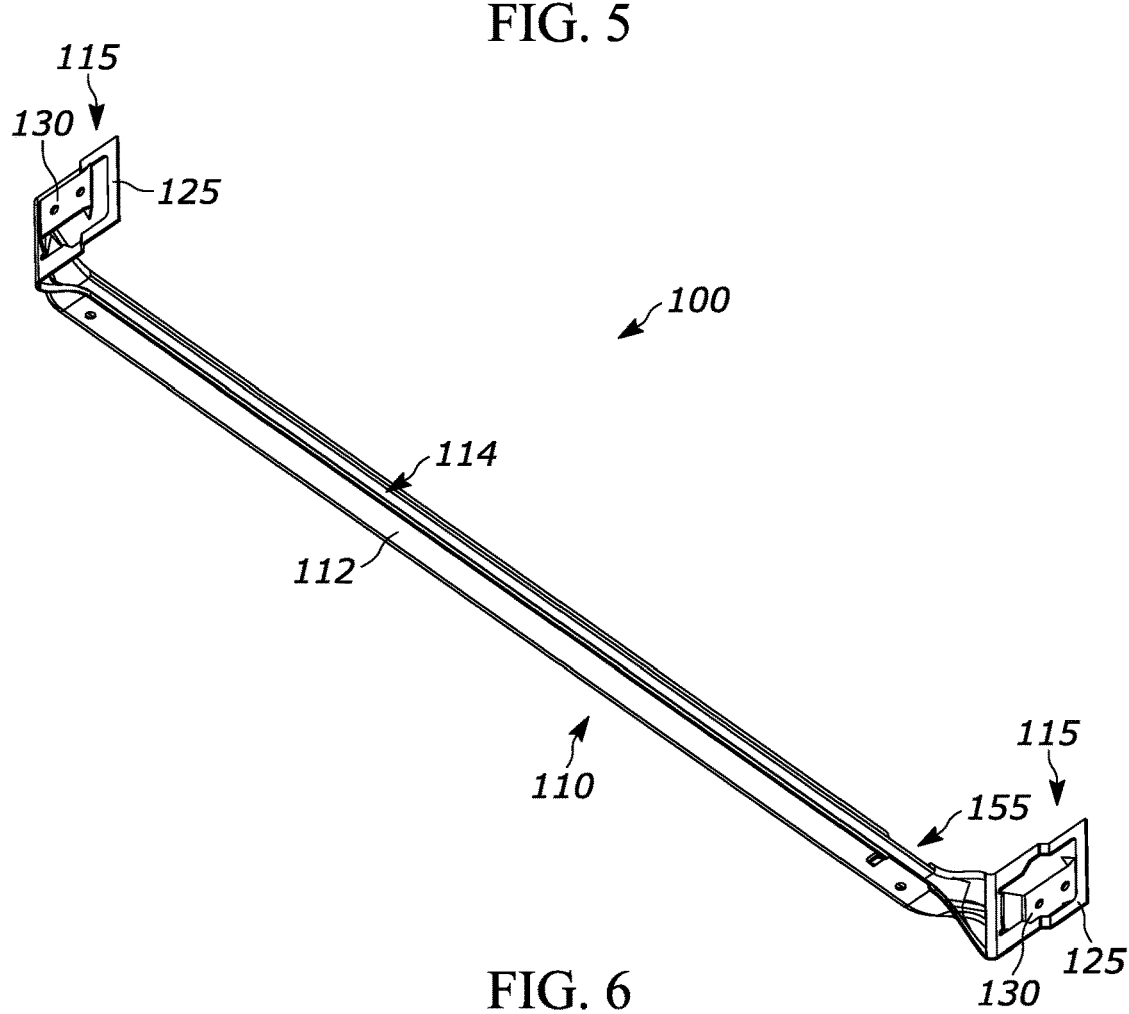
FIG. 6 shows a perspective view of the mounting brace of FIG. 1.
Figure 7:
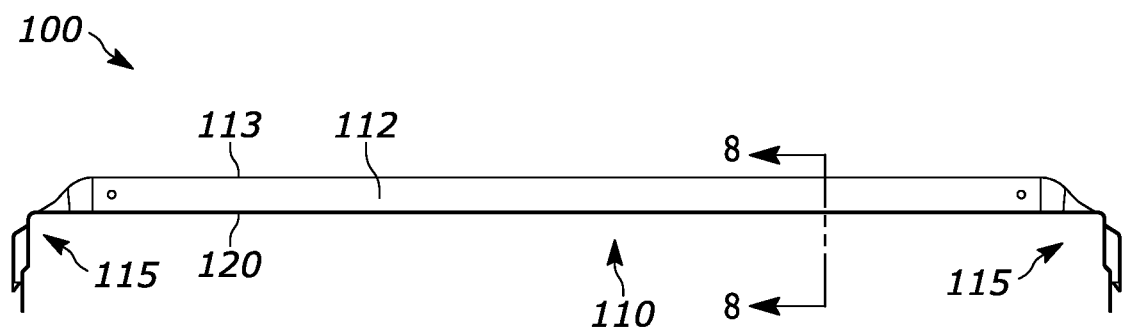
FIG. 7 shows a side view of the mounting brace of FIG. 6.
Figure 8:
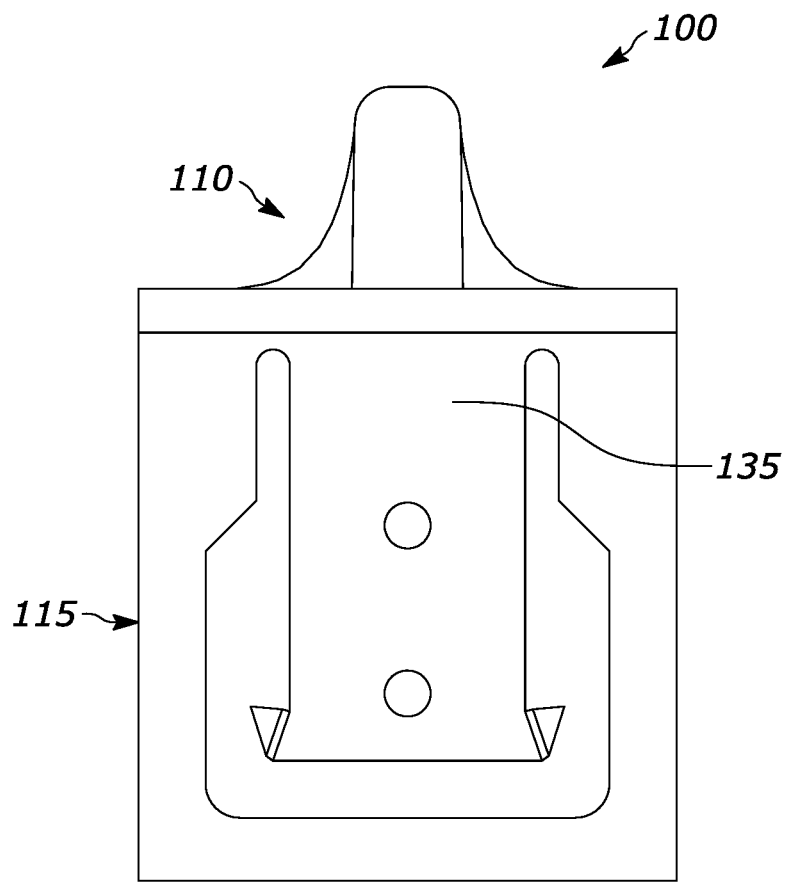
FIG. 8 shows a cross-sectional view of the mounting brace of FIG. 7, viewed along line 8-8.

As shown in FIGS. 6 to 8, the mounting brace 100 may be an elongated member. The mounting brace 100 may include a central body 110 and a pair of connecting ends 115. In the illustrated example, the central body 110 and the connecting ends 115 may be formed together as a unitary piece, although in other examples, the connecting ends 115 may be separate from the central body 110.

In the illustrated example, the central body 110 may be substantially U-shaped and include a pair of elongated surfaces 112 and a top surface 113. Each elongated surface 112 may be substantially perpendicular to the top surface 113, although other orientations may be used. A channel 114 is formed between the elongated surfaces 112 and the top surface 113 so that the center of the central body 110 is hollow. The top surface 113 may be substantially solid along its length (e.g., include no opening) so that the channel 114 is only accessible from underneath the central body 110.

In the illustrated example, the connecting ends 115 may be substantially perpendicular to the central body 110, although in other examples the connecting ends 115 may be oriented at different angles.

The central body 110 may include a rail 120 that extends substantially perpendicularly from the remainder of the central body 100 (although other examples may include a rail 120 that extends at a different angle). The rail 120 may extend substantially the entire length of the central body 110. As described in more detail below, the rail 120 may extend substantially along the length of the central body 110 but may not extend along the entire length of the central body 110. The illustrated example includes a pair of rails 120 on either side of the central body 110.

As shown in FIG. 8, each of the connecting ends 115 includes an outer section 125 and an inner section 130. The outer section 125 may have an inner perimeter and an outer perimeter. The outer perimeter may have substantially rectangular shape (although other shaped may be used—e.g., rounded shapes). The inner perimeter may have a different shape (although it may have a rectangular shape). The inner section 130 may extend from the outer perimeter and be formed as a cantilever shaped. In other words, the inner section 130 includes a fixed end 135 that extends from the outer perimeter and a free end 140 that is disposed within the inner perimeter. The free end 140 may be movable relative to the outer section 125.

Figure 9:
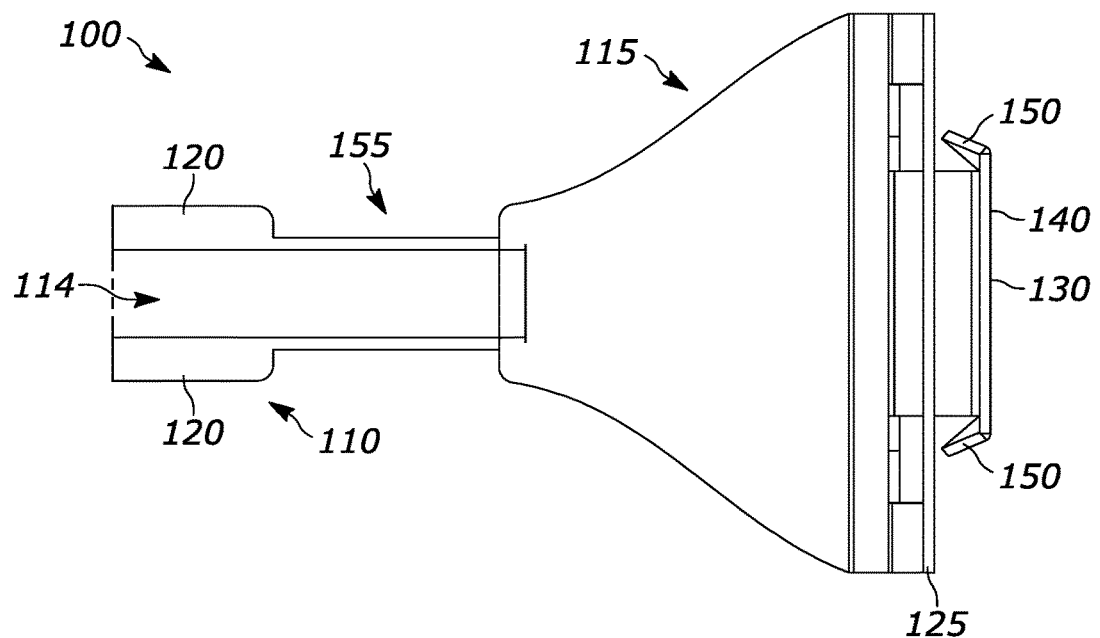
FIG. 9 shows a top view of a connection end of the mounting brace of FIG. 6.
Figure 10:
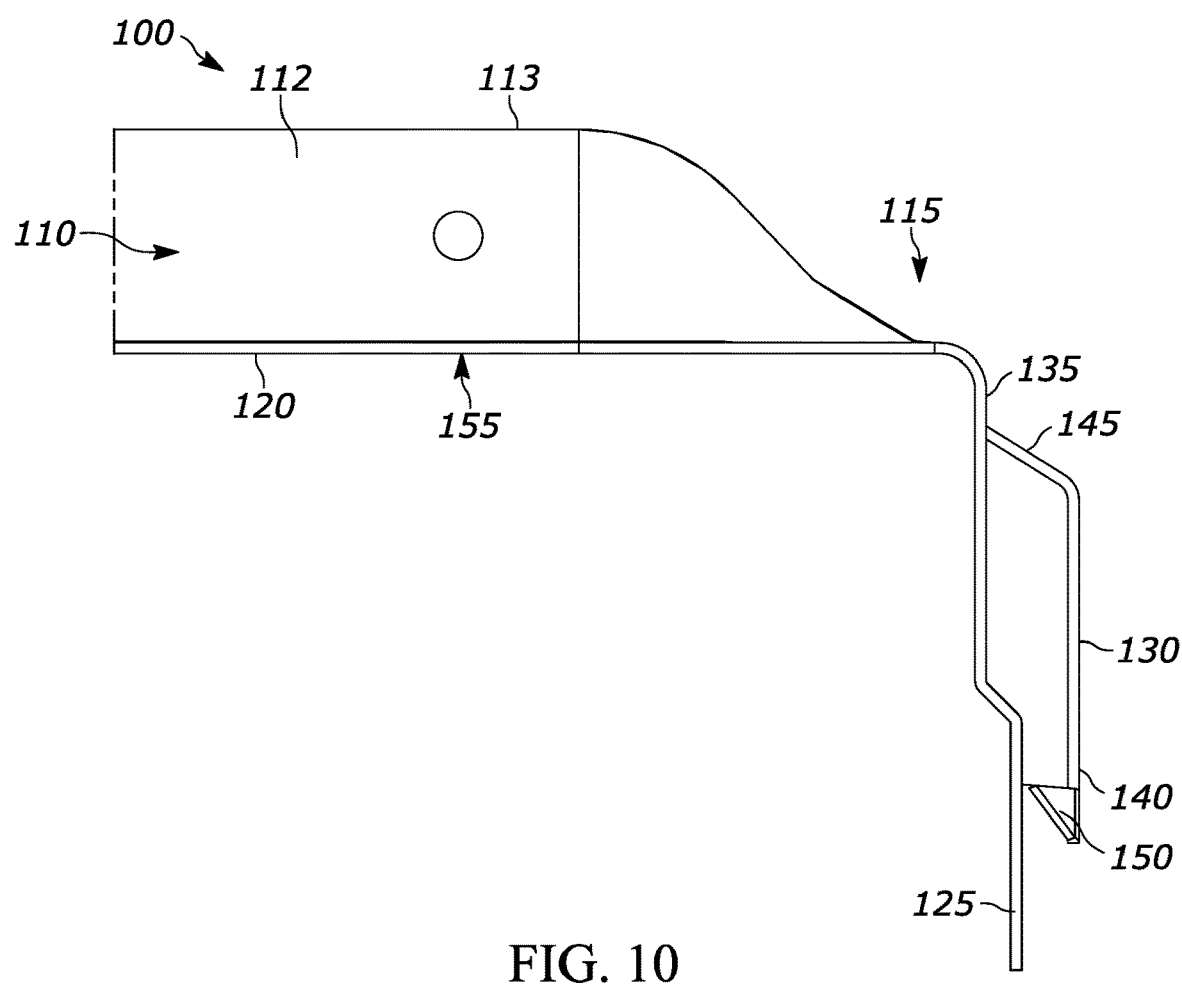
FIG. 10 shows a side view of the connection end of the mounting brace of FIG. 6 according to a first example.
Figure 11:
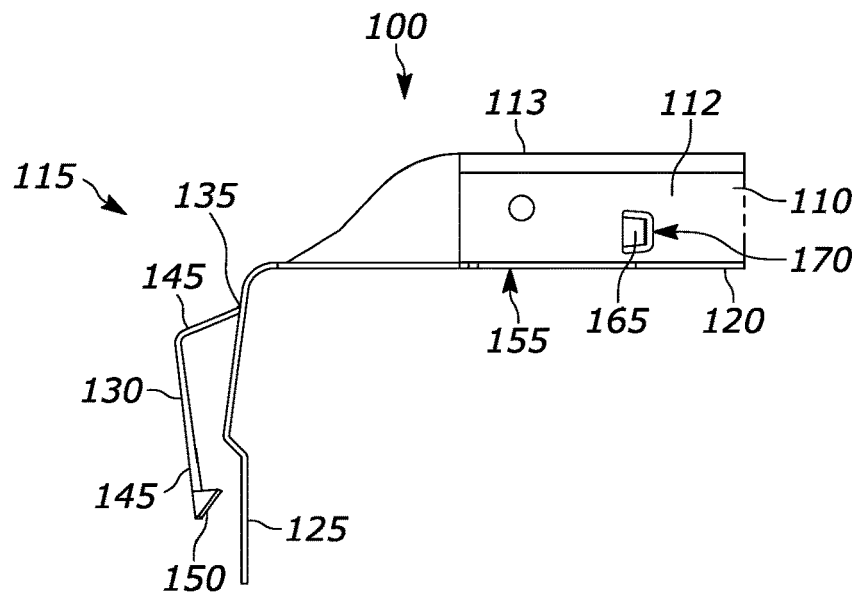
FIG. 11 shows a side view of the connection end of the mounting brace of FIG. 6 according to a second example.

As shown in FIGS. 9 to 11, the inner section 130 may axially extend from the outer section 125 (e.g., along an axis parallel to the central body 110). In other words, the inner section 130 is at least partially disposed on a different plane than the outer section 125.

With specific reference to FIGS. 10 and 11, the fixed end 135 extends from the outer section 125 in an inclined direction. The inner section 130 includes a transition 145 where the inner section 130 may become substantially parallel to the outer section 125, but on a separate plane (see e.g., FIG. 10). Alternatively, the inner section 130 may remain inclined relative to the outer section 125 after the transition 145 (see e.g., FIG. 11).

In certain forms, the inner section 130 may be bendable and may allow a user to adjust the angle of the transition 145, and thereby adjust the angle of the inner section 130 relative to the outer section 125.

Returning to FIG. 9, the free end 140 may include a pair of engaging elements 150. In the illustrated example, the engaging elements 150 may be formed at the edges of the free end 140. The engaging elements 150 may be bent inwardly (e.g., toward each other and toward the outer section 125). In certain forms, the engaging elements 150 may have a substantially triangular shape (although any other shape may be used).

With continued reference to FIG. 9, the rail 120 may not extend the entire length of the central body 110. For example, the rail 120 on either side of the central body 110 may extend substantially the same length. The rail 120 may terminate proximate to but spaced apart from one of the connecting ends 115. This creates a mounting space 155. The illustrated mounting space 155 is formed between the rail 120 and a connecting end 115, although other examples may include the mounting space 155 in a different location (e.g., between two sections of the rail 120).

Returning to FIG. 6, the mounting space 155 may be formed on only one end of the central body 110. In other words, the rail 120 may extend entirely to one of the connecting ends 115 and is spaced apart from the other connecting end 115. In other examples (not shown), the rail 120 may be spaced apart from both connecting ends 115 to form a mounting space 155 proximate to both connecting ends 115.

Returning to FIG. 10, the central body 110 of the mounting brace 100 may be substantially smooth. For example, the elongated surfaces 112 of the central body 110 may be substantially free from surface projections.

Figure 12:
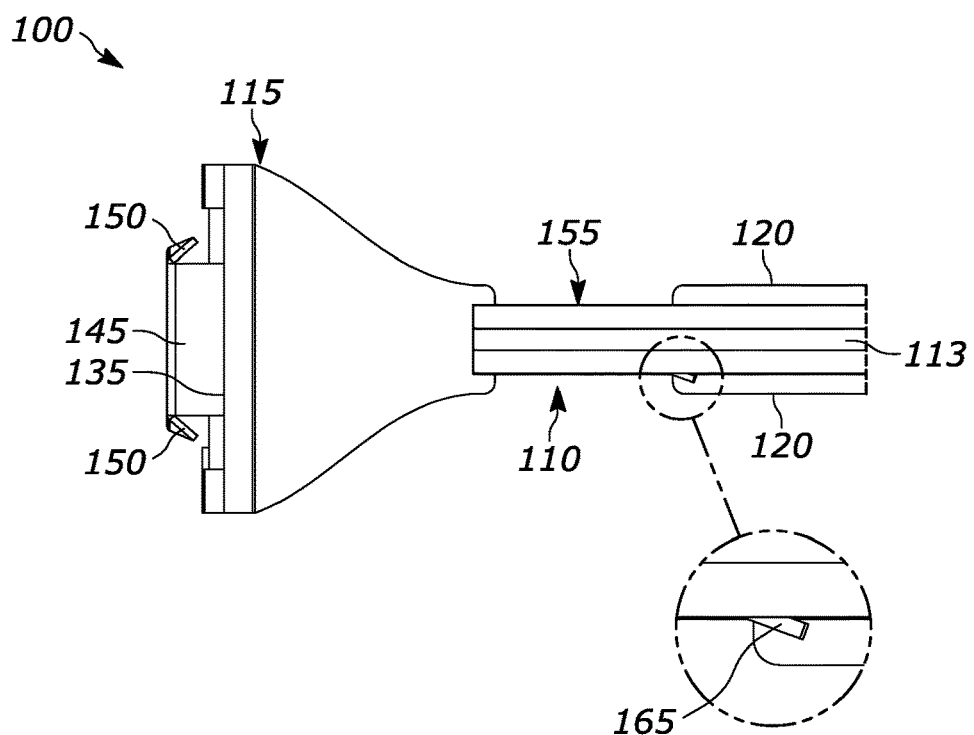
FIG. 12 shows a top view of the connection end of the mounting brace of FIG. 6 according to a second example.

As shown in FIGS. 11 and 12, other examples of the central body 110 includes a catch 165 that extends from the elongated surface 112. The illustrated example includes a single catch 165 (e.g., a catch 165 on only one of the elongated surfaces 112), although in other examples the central body 110 may include a catch 165 on both elongated surfaces 112.

The catch 165 may be a cantilever member with a fixed end connected to the elongated surface 112 and a free end extending away from the fixed end. As shown in FIG. 12, the catch 165 is inclined relative to the elongated surface 165. The fixed end may be proximate to the mounting space 155 and the free end may extend toward the opposite connecting end 115.

Returning to FIG. 11, the central body 110 may include an opening 170 that at least partially surrounds the catch 165. The catch 165 may be bendable about the fixed end and may be able to at least partially move into the opening 170 upon application of a force.

Figure 13:
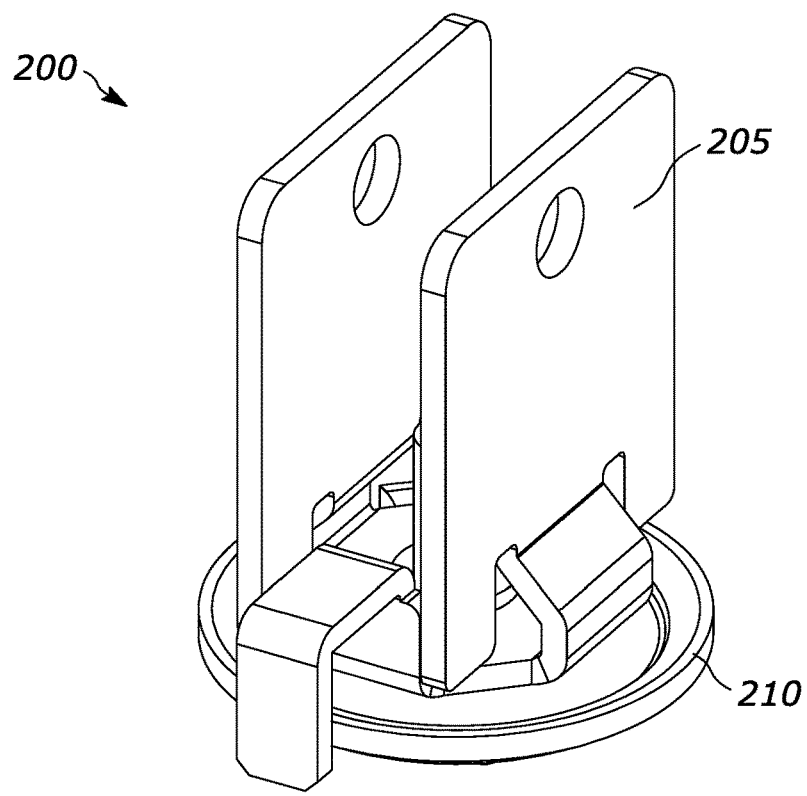
FIG. 13 shows a top perspective view of a connection assembly for connecting the mounting brace of FIG. 1 to the electrical box.
Figure 14:
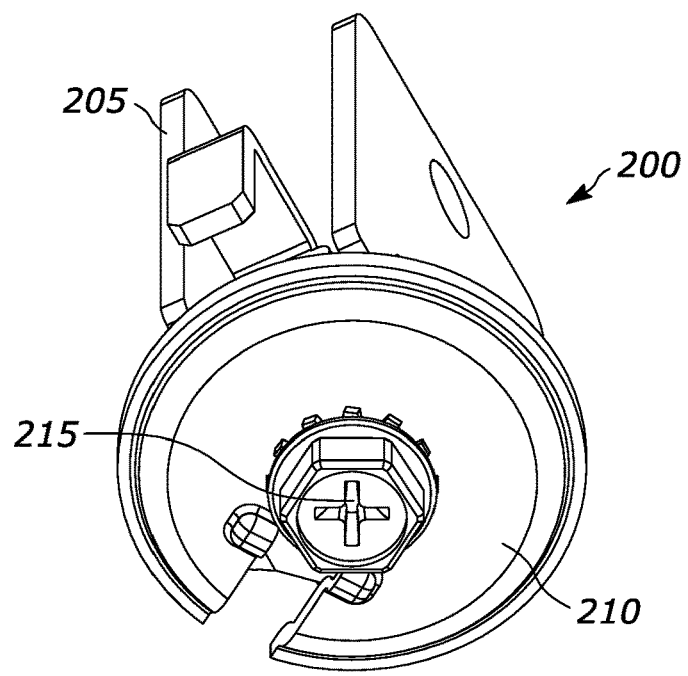
FIG. 14 shows a bottom perspective view of a connection assembly for connecting the mounting brace of FIG. 1 to the electrical box.

An example of a connection assembly 200 is illustrated in FIGS. 13 and 14. The connection assembly 200 includes a bracket 205, a washer 210, and a fastener (e.g., a screw) 215.

As shown in FIGS. 15 to 18, the bracket 205 includes a base portion 220 and a pair of side portions 225. The base portion 220 includes a center 230 with a substantially flat surface and an opening 227 for receiving the fastener 215. The side portions 225 may be oriented substantially perpendicularly with respect to the center 230. The side portions 225 are spaced apart from one another by a width W.

The base portion 220 also includes a pair of wings 235. Each wing 235 connects to an outer surface of one of the side portions 225. In some forms, the base portion 220 and the side portions 225 may be integrally formed (e.g., in a mold), while in other examples, the wings 235 may be separate from the side portions 225 and may be connected during assembly (e.g., via welding).

Figure 15:
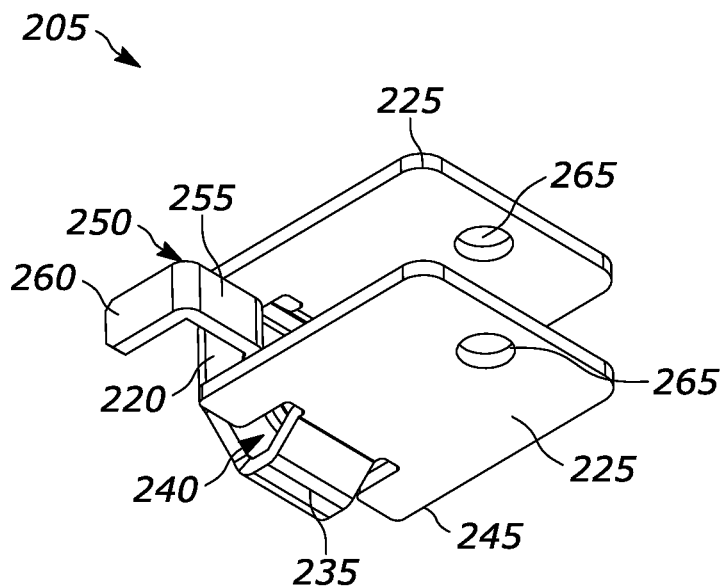
FIG. 15 shows a perspective view of the mounting bracket of used in the connection assembly of FIG. 13.
Figure 18:
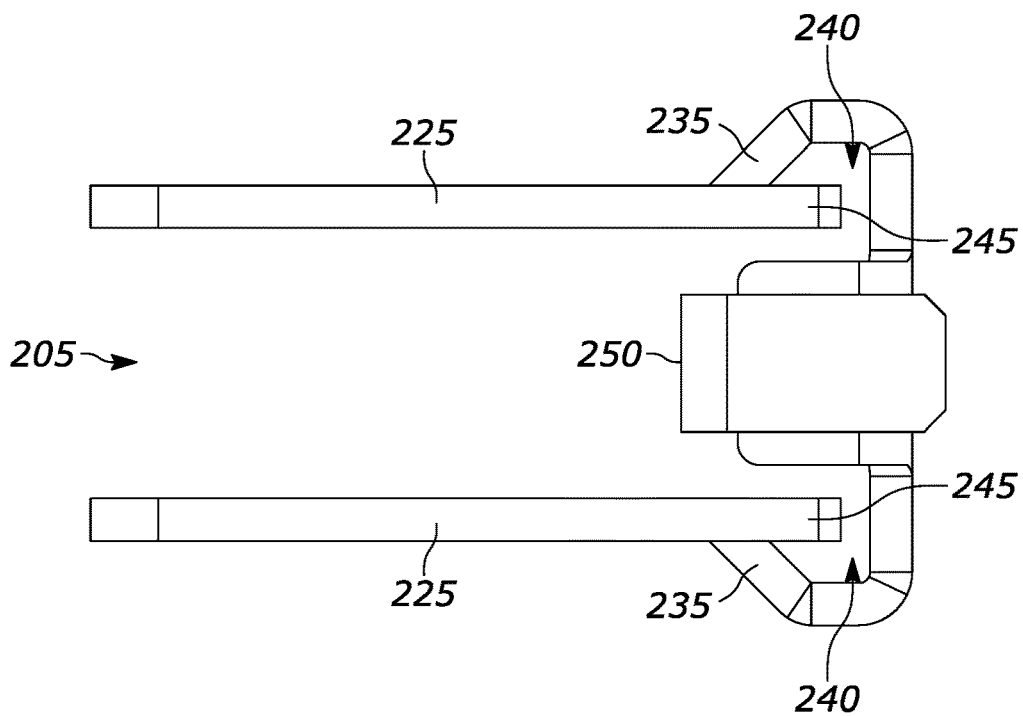
FIG. 18 shows a front view of the mounting bracket of FIG. 15.

As shown in FIGS. 15 and 18, the wings 235 may be bent when connecting to the respective side portion 225 to form a channel 240 on either side of the bracket 205. Ends 245 of the side portions 225 may extend at least partially into the channel 240 to form a substantially complete perimeter. For example, the ends 245 may extend proximate to, but be spaced part from, the surface of the center 230.

Figure 16:
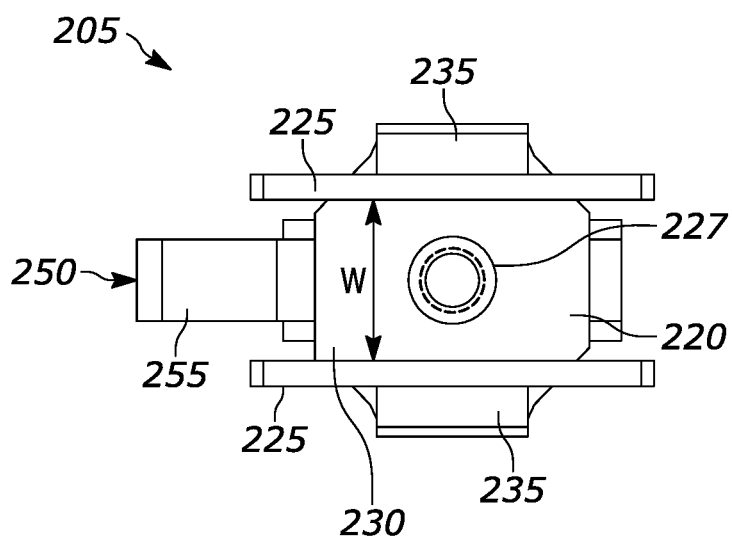
FIG. 16 shows a top view of the mounting bracket of FIG. 15.
Figure 17:
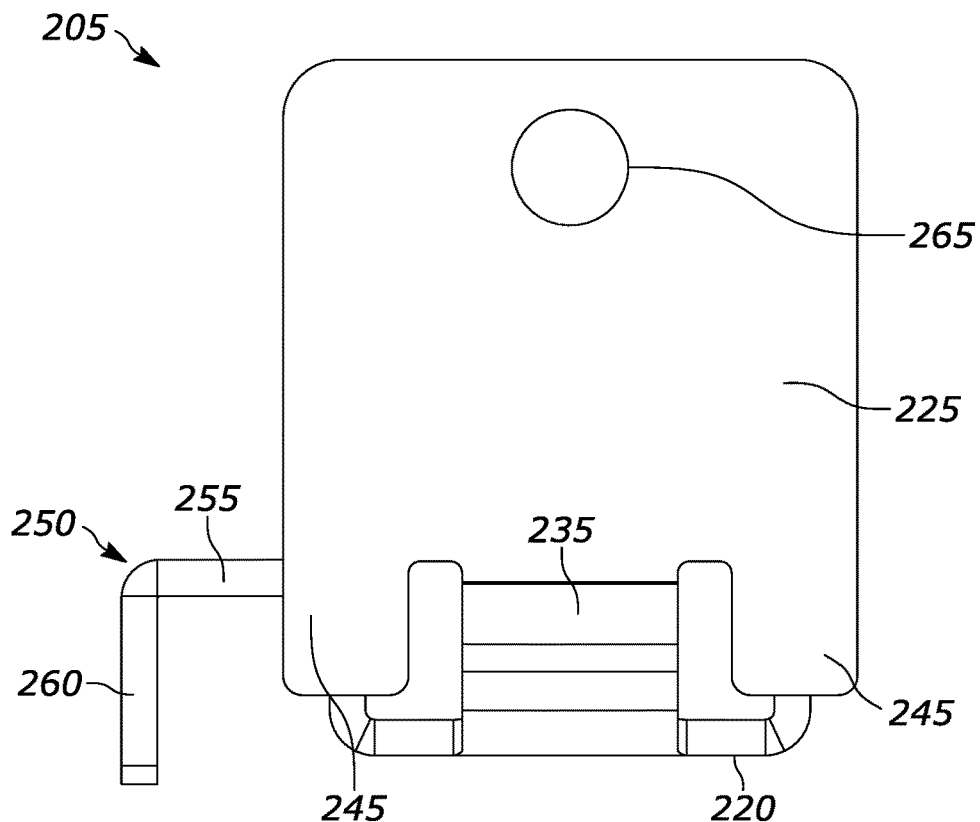
FIG. 17 shows a side view of the mounting bracket of FIG. 15.

As shown in FIGS. 15 to 17, a projection 250 extends from the center 230 between the pair of side portions 225. For example, the projection 250 extends at least partially in a direction perpendicular to the width W.

As shown in FIG. 17, the projection 250 may be substantially L-shaped. In other words, the projection 250 includes a first region 255 and a second region 260. The first region 255 may be fixed to the center 230 and the second region 260 include a free end. The second region 260 may also be substantially perpendicular to the first region 255 (although it could also be formed at another angle).

In other examples (not shown), a second projection may extend from the center 230. The two projections may extend in opposite directions and may both include the L-shape, although other shapes may also be used.

With continued reference to FIG. 17, each of the side portions 225 may include an opening 265, which may have a substantially circular shape (although other shapes may be used). The opening 265 may be disposed proximate to the free end of each of the side portions 225 (e.g., distal to the center 230). In other examples, only one side portion 225 or none of the side portions 225 may include an opening 265.

Figure 19:
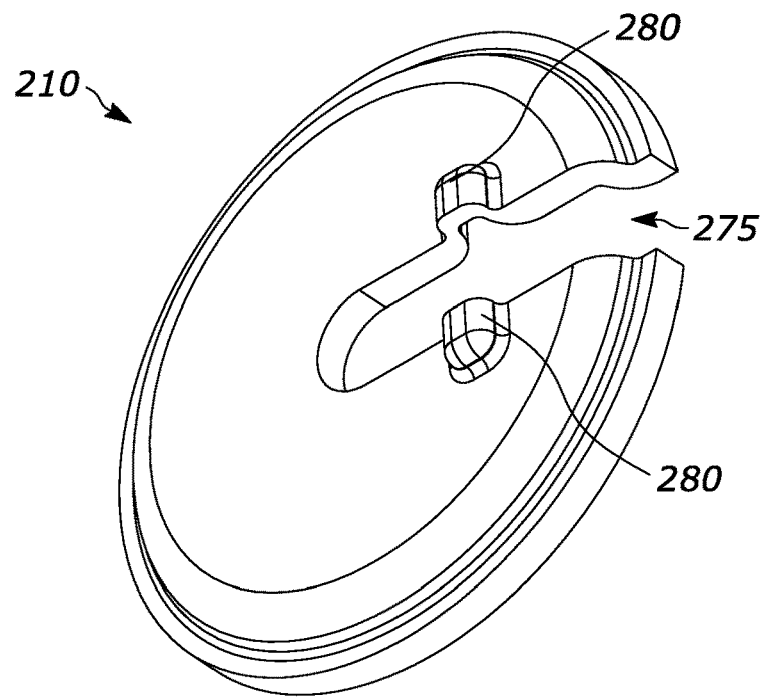
FIG. 19 shows a perspective view of a washer used with the connection assembly of FIG. 13.

As shown in FIG. 19, the washer 210 may have a substantially circular outer perimeter. The washer 210 may also include a channel 275 that extends from the outer perimeter of the washer 210 toward a center. A pair of protrusions 280 may be disposed on either side of the channel 275.

Figure 20:
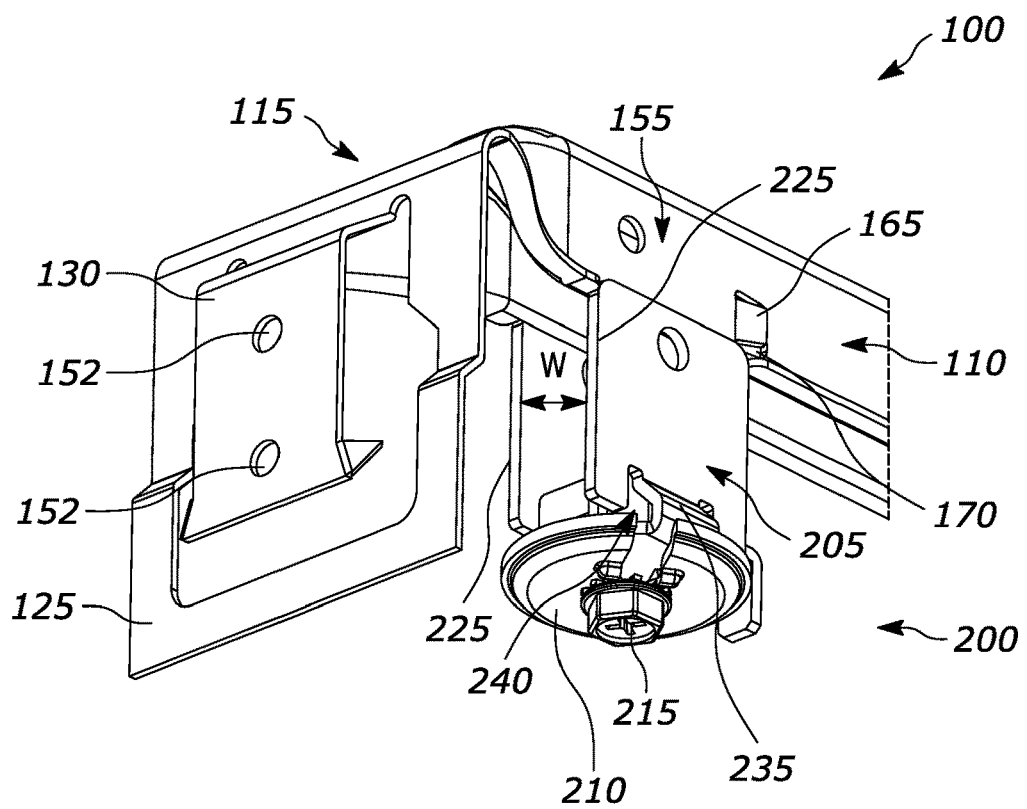
FIG. 20 shows the connection assembly of FIG. 13 being connected to mounting brace of FIG. 6.

As shown in FIG. 20, the bracket 205 is connected to the mounting brace 100 by positioning side portions 225 on either side of the central body 110. Specifically, the bracket 205 is positioned proximate to the mounting space 155. The width W between the side portions 225 is greater than the width of the central body at the mounting space 155. Although in other examples, the width W may be approximately the same or smaller than the width of the central body and the side portions 225 may be able to flex to reach the necessary width. Additionally, the distance between the rail 120 and the connecting end 115 is greater than the length of each side portion 225. In other words, the mounting space 155 is sized to receive the bracket 205.

In the illustrated example, the bracket 205 may be mounted to the mounting brace 100 from below. In other words, the bracket 205 may begin below the rail 120 and move in an upward direction (e.g., as shown in FIG. 20) so that the pair of side portions 225 pass along the elongated surfaces 112 after passing through the mounting space 155.

Figure 21:
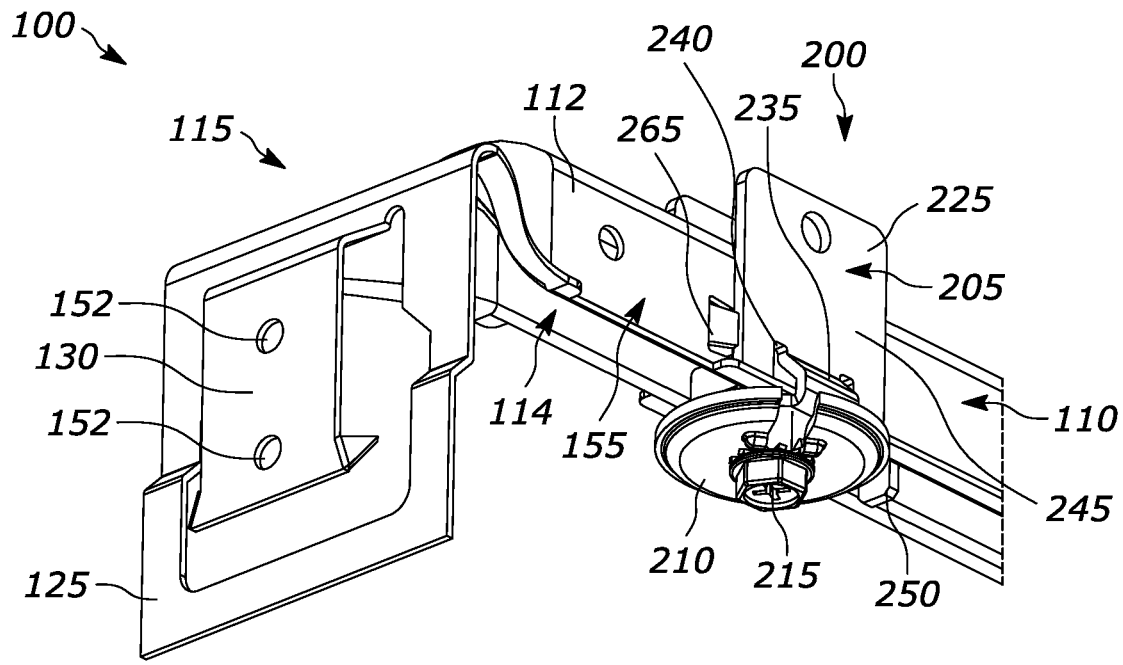
FIG. 21 shows the connection assembly of FIG. 13 being slid along mounting brace of FIG. 6.
Figure 22:
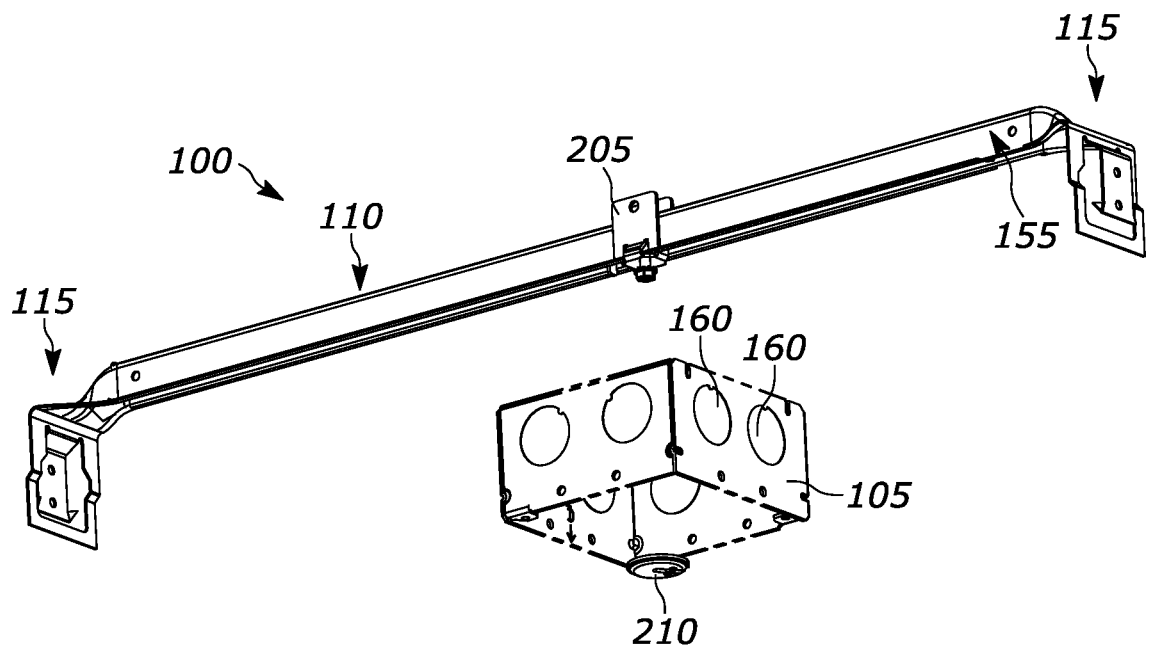
FIG. 22 shows the electrical box being connected to the connection assembly.

As shown in FIG. 21, the bracket 205 may continue to be inserted through the mounting opening 155 until the center 230 of the bracket 205 is proximate to or in contact with the rail 120. In this position, the rail 120 is substantially aligned with the channels 240. A user may move (e.g., slide) the bracket 205 toward the opposite connecting end 115. The rail 120 may be inserted into the respective channel 240 to guide the movement of the bracket 205. Additionally, the ends 245 of each of the side portions 225 may contact (or be positioned in close proximity to) the top of the rail 120 in order to limit relative movement between the bracket 205 and the mounting brace 100 as a result of gravity.

The center 230 and the projection 250 may be positioned proximate to or at least partially within the channel 114 of the central body 110. The channel 114 may allow the bracket 205 to move along the rail 120 without interference from the projection 250.

In the illustrated example, the catch 165 acts to limit inadvertent removal of the bracket 205 from the mounting brace 100. As described above, the catch 165 is formed as a cantilever member within an opening 170. As the bracket 205 is inserted into the mounting space 155 and begins to move along the rails 120, the side portion 225 contacts the catch 165 and flexes it into the opening 170 thereby allowing the bracket 205 to pass over the catch 165. Once the side portion 225 has completely cleared the catch, the catch 165 returns to its initial position (e.g., inclined relative to the elongated surface 112). When sliding the bracket 205 back toward the mounting opening 155, contact between the slide portion 225 and the catch 165 may not displace the catch 165 into the opening 170. In other words, the catch 165 acts as a stop to limit the user from removing the bracket 205. A user could manually depress the catch 165 into the opening 170 while sliding the bracket 205 to facilitate removal.

In other examples (e.g., FIG. 10), the mounting brace 100 may not include a catch 165 and the bracket 205 can freely slide onto and off the central body 110.

A user may position the bracket 205 at any desired position along the length of the central body 110. Once in position, the bracket 205 can be connected to the electrical box 105. The electrical box 105 may include a plurality of knock-outs 160, which can be selectively removed by the user to create an opening to the interior of the electrical box 105.

When the selected knock-out 160 is removed, the washer 210 may be positioned in the newly created opening of the electrical box 105. The fastener 215 may be inserted through the channel 275 of the washer 210 to connect to the bracket 205 via the opening 227 (e.g., through the washer 210 before the bracket 205). Once connected (e.g., fully tightened), the head of the fastener 215 may contact the protrusions 280 to limit relative movement between the fastener 215 and the electrical box 105 (via the washer 210).

Alternatively, the fastener 215 may be preconnected to the bracket 205. After the washer 210 is positioned in a space previously occupied by a knock-out 160, the fastener 215 can be loosened (or can begin loosened) so that it can be positioned through the channel 275. The fastener 215 can then be tightened so that the protrusions 280 limit relative movement.

In further alternative forms, the bracket 205 may not be infinitely adjustable along the length of the central body 110. Instead, the central body 110 may include a plurality of stops. The bracket 205 may be freely slidable between adjacent stops and may be retained in position at a desired stop. This example may not require a fastener 215 to secure the bracket 205 in the desired location.

Figure 2:
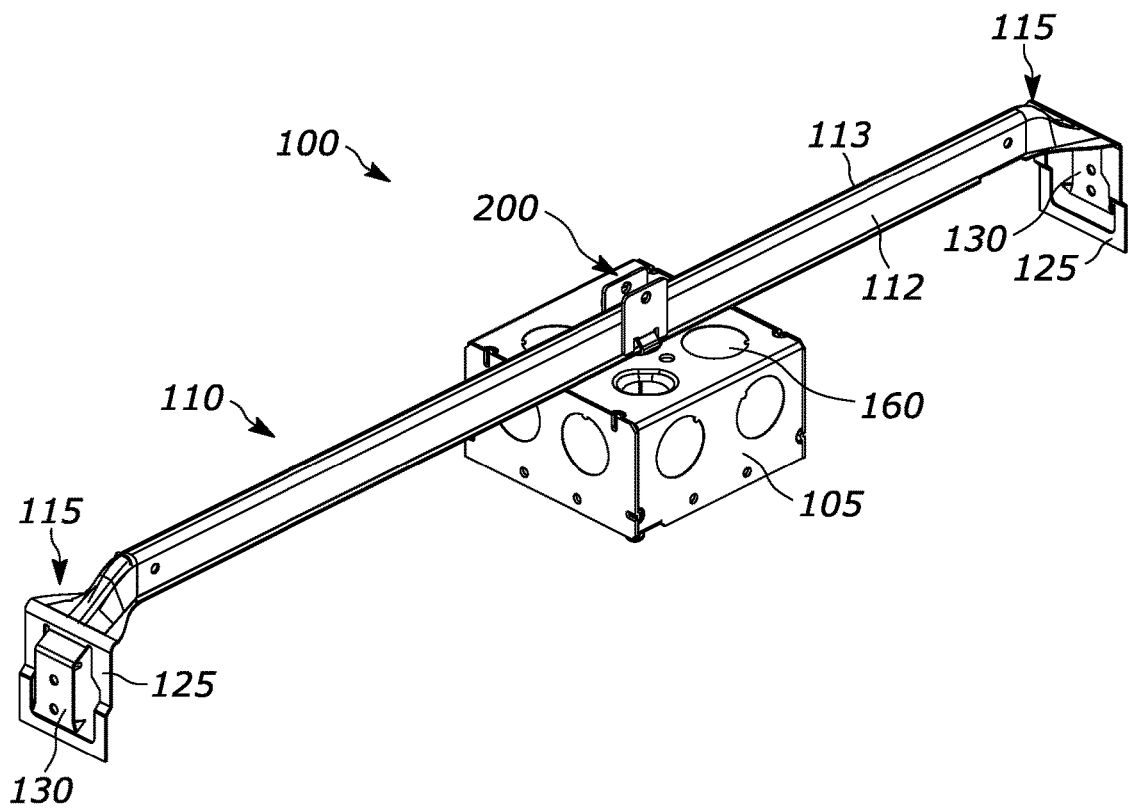
FIG. 2 shows a perspective view of the mounting brace supporting the electrical box of FIG. 1 when separate from the ceiling supports.

Even when the electrical box 105 is connected to the connection assembly 200 (see e.g., FIG. 2), the electrical box 105 may still be movable relative to the central body 110. For example, the bracket 205 may be slidable along the rails 120 even when the fastener 215 is connected between the electrical box 105 and the bracket 205.

When connected, the section region 260 may be positioned within an opening (not shown) of the electrical box 105. The section region 260 may assist in limiting relative movement (e.g., rotational movement) between the electrical box 105 and the bracket 205.

Returning to FIG. 1, the connecting ends 115 are connected to the ceiling supports 75 to support the mounting brace 100 above the ceiling. The connection between the respective connecting end 115 and ceiling support 75 may be made before or after the electrical box 105 is connected to the mounting brace 100.

Figure 3:
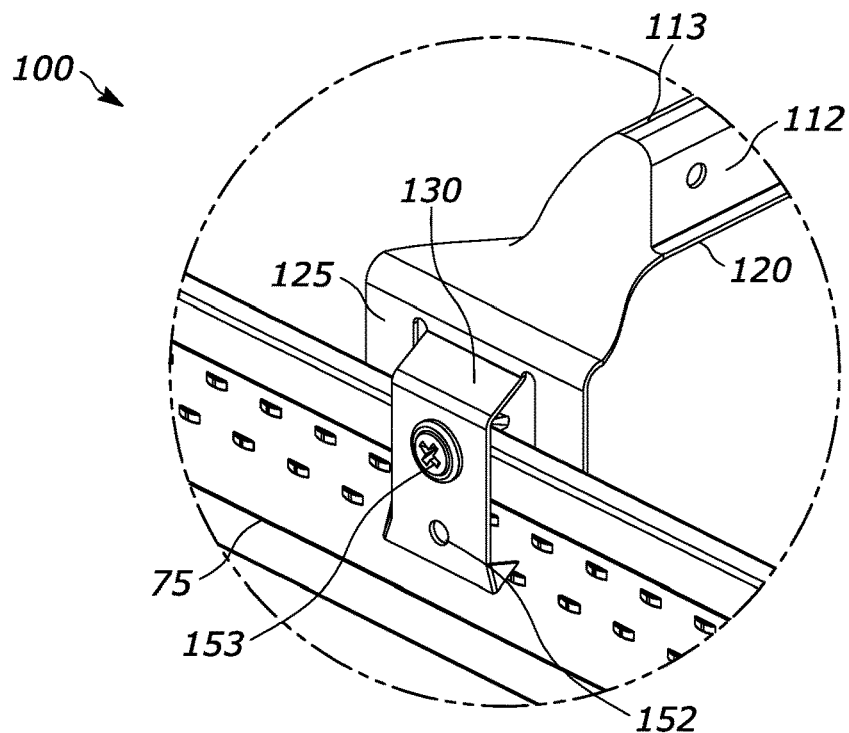
FIG. 3 shows a first detail view of the mounting brace of FIG. 1 connected to one of the ceiling supports.
Figure 4:
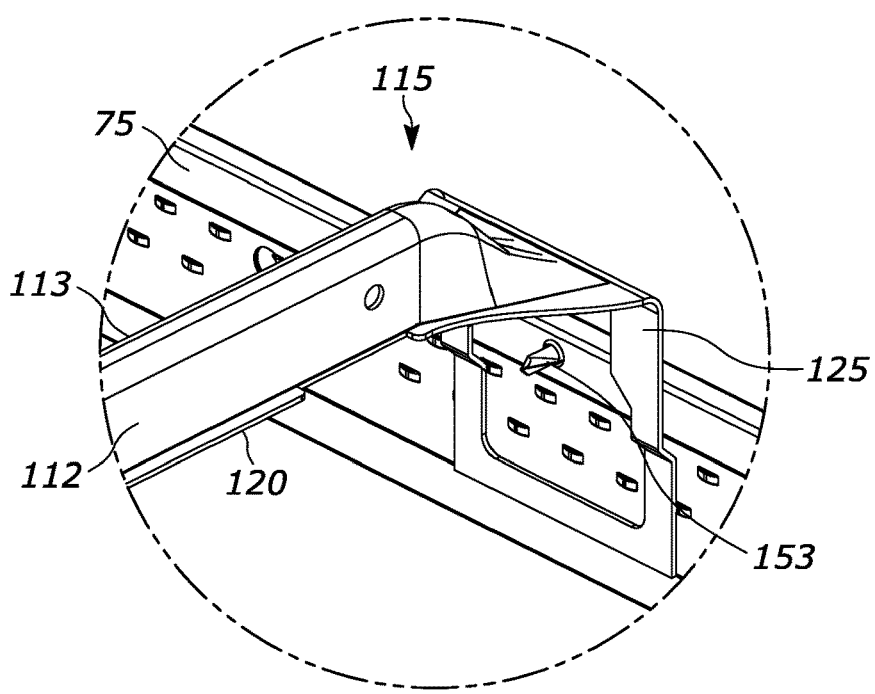
FIG. 4 shows a second detail view of the mounting brace of FIG. 1 connected to one of the ceiling supports.
Figure 5:
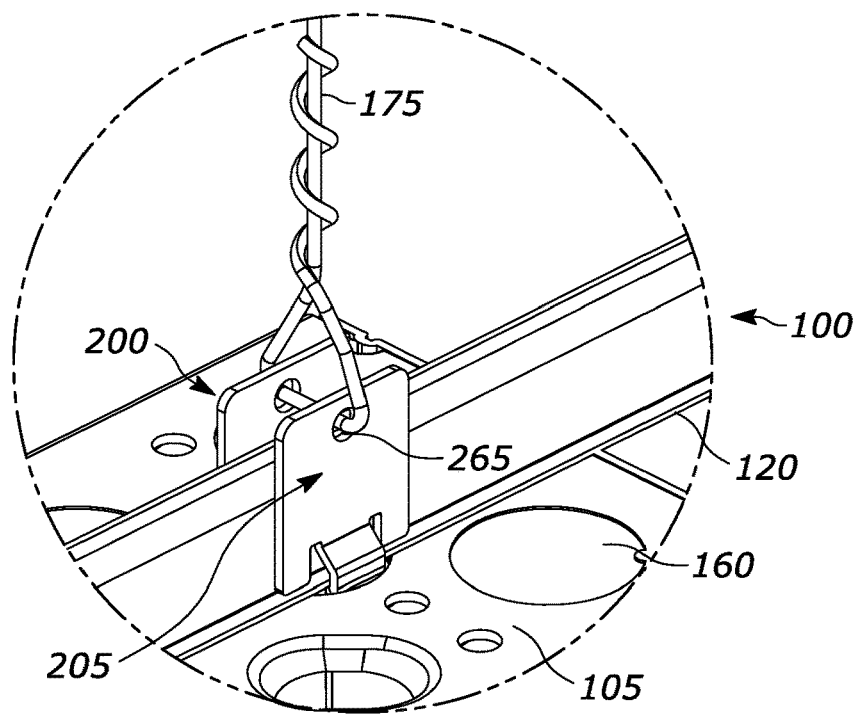
FIG. 5 shows a detail view of a cable supporting the mounting brace of FIG. 1 via the mounting bracket while connected to the ceiling supports.

As shown in FIGS. 3 and 4, the connecting end 115 is connected to the respective ceiling support 75 by positioning the outer section 125 and the inner section 130 on opposite sides of the ceiling support 75. The connecting end 115 may be connected above the ceiling support 75 so that gravity assists with retaining the mounting brace 100 to the ceiling supports 75.

In the illustrated example, the inner section 130 is positioned on an outside of the respective ceiling support 75 and the outer section 125 is positioned on the inner side of the respective ceiling support. The cantilevered inner section 130 can flex relative to the outer section 125 to be positioned on opposite sides of the ceiling support 75. This flexion may be assisted by the transition 145, which initially spaces the inner section 130 from the outer section 125 to require less relative movement.

The engaging elements 150 may contact the surface of the ceiling support 75 in use to limit inadvertent disengagement between the mounting brace 100 and the ceiling support 75.

The inner section 130 may include one or more mounting holes 152. A fastener (e.g., a threaded screw) 153 can be inserted through one of the mounting holes 152 and through the ceiling support 75 to secure the mounting brace 100 to the ceiling support 75.

A cable 175 may be inserted through the openings 265 on each side portion 225. The cable 175 may provide additional support for opposing the gravitational force on the electrical box 105 and the mounting brace 100.

One of ordinary skill will appreciate that the exact dimensions and materials are not critical to the disclosure and all suitable variations should be deemed to be within the scope of the disclosure if deemed suitable for carrying out the objects of the disclosure.

One of ordinary skill in the art will also readily appreciate that it is well within the ability of the ordinarily skilled artisan to modify one or more of the constituent parts for carrying out the various examples of the disclosure. Once armed with the present specification, routine experimentation is all that is needed to determine adjustments and modifications that will carry out the present disclosure.

The above examples are for illustrative purposes and are not intended to limit the scope of the disclosure or the adaptation of the features described herein. Those skilled in the art will also appreciate that various adaptations and modifications of the above-described preferred examples can be configured without departing from the scope and spirit of the disclosure. Therefore, it is to be understood that, within the scope of the appended claims, the invention may be practiced other than as specifically described.

What is claimed is:

1. A brace for mounting an electrical box between supports, the brace comprising:
   a central body comprising:
   a pair of elongated sides each having a first end and a second end,
   a top surface connected between each first end, and
   a rail connected to each second end and extending substantially along the length of the pair of elongated sides;
   a first connecting end connected to a first end of the central body;
   a second connecting end connected to a second end of the central body; and
   a catch extending from at least one elongated side of the pair of elongated sides, wherein the catch is vertically aligned with the rail;
   wherein the central body, the first connecting end, and the second connecting end are integrally formed in a one-piece construction; and
   wherein each rail is spaced apart from at least one of the first connecting end and the second connecting end to form a mounting space.

2. The brace of claim 1, wherein the catch is formed as a cantilever member and is biased away from the at least one elongated side.

3. The brace of claim 1, wherein the first connecting end and the second connecting end extend from the second ends in a direction opposite the top surface, and wherein the first connecting end and the second connecting end are configured to support the central body above the supports.

4. The brace of claim 1, wherein the pair of elongated sides and the top surface for a substantially U-shape, and wherein the central body further includes a channel at least partially formed by an inner surface of the pair of elongated sides and the top surface.

5. The brace of claim 1, wherein the first connecting end and the second connecting end each include an outer portion and an inner portion, the inner portion is formed as a cantilever member and is movable relative to the outer portion.

6. The brace of claim 1, wherein each rail is oriented perpendicularly with respect to each second end.

7. A bracket for mounting an electrical box to a brace, the bracket comprising:
   a base portion including a center, a first wing and a second wing, and a projection configured to be received within an opening of the electrical box to limit relative movement, wherein the projection includes a first section and a second section formed perpendicular to the first section, wherein the first section is connected to the base portion and the second section is configured to be received within the opening of the electrical box;
   a first side portion extending from the base portion, the first side portion including a first end and a second end, wherein the first wing portion is connected to the first side portion proximate to the first end and a first channel is formed between the first end of the first side portion and the first wing portion; and
   a second side portion extending from the base portion and spaced apart from the first side portion, the second side portion including a first end and a second end, wherein the first wing portion is connected to the first side portion proximate to the first end and a second channel is formed between the first end of the second side portion and the first wing portion.

8. The bracket of claim 7, further comprising a first opening proximate to the second end of the first side portion and a second opening proximate to the second end of the second side portion, wherein the first opening and the second opening are aligned, and wherein the first opening and the second opening are configured to receive a cable for supporting the bracket.

9. The bracket of claim 7, wherein the base portion further comprises an opening configured to receive a fastener for connecting the bracket to the electrical box.

10. A mounting assembly comprising:
a brace comprising:
a central body comprising:
a pair of elongated sides each having a first end and a second end,
a top surface connected between each first end, and
a rail connected to each second end and extending substantially along the length of the pair of elongated sides;
a first connecting end connected to a first end of the central body; and
a second connecting end connected to a second end of the central body;
wherein each rail is spaced apart from at least one of the first connecting end and the second connecting end to form a mounting space;
a connection assembly comprising:
a bracket comprising:
a base portion including a center and a first wing and a second wing;
a first side portion extending from the base portion, the first side portion including a first end and a second end, wherein the first wing portion is connected to the first side portion proximate to the first end and a first channel is formed between the first end of the first side portion and the first wing portion; and
a second side portion extending from the base portion and spaced apart from the first side portion, the second side portion including a first end and a second end, wherein the first wing portion is connected to the first side portion proximate to the first end and a second channel is formed between the first end of the second side portion and the first wing portion;
wherein the first side portion and the second side portion are sized to be removably received within the mounting space; and
wherein the first channel and the second channel are each configured to removably receive one of the rails, the bracket being selectively slidable along the rails.

11. The mounting assembly of claim 10, further comprising a catch extending from at least one elongated side of the pair of elongated sides, wherein the catch is vertically aligned with the rail, and wherein the catch is configured to limit transitional movement of the bracket relative to the central body.

12. The mounting assembly of claim 10, wherein the pair of elongated sides and the top surface for a substantially U-shape, wherein the central body further includes a channel at least partially formed by an inner surface of the pair of elongated sides and the top surface, and wherein the bracket is at least partially received within the channel while in use.

13. The mounting assembly of claim 10, wherein the central body, the first connecting end, and the second connecting end are integrally formed in a one-piece construction.

14. The mounting assembly of claim 10, wherein the connection assembly further comprises a washer and a fastener, wherein the washer includes a washer channel configured to receive the fastener and the base portion of the bracket includes an opening configured to receive the fastener.

15. The mounting assembly of claim 10, further comprising an electrical box, wherein the connecting assembly removably connects the electrical box to the brace.

16. The mounting assembly of claim 10, wherein the first end of the first side portion and the first end of the second side portion are configured to contact the rail and support the bracket against a gravitational force in use.

17. The mounting assembly of claim 10, wherein the base portion further includes a projection configured to be received within an opening of the electrical box to limit relative movement, wherein the projection includes a first section and a second section formed perpendicular to the first section, and wherein the first section is connected to the base portion and the second section is configured to be received within an opening of the electrical box.

18. The brace of claim 1, wherein the central body extends along a body axis and each rail extends radially outwardly in a direction away from the body axis, and wherein each rail is directly connected to the first connecting end and is spaced apart from the second connecting end.

19. The bracket of claim 7, wherein the first wing portion is connected to the first side portion between the first end and the second end, and wherein the first channel is formed between the first wing portion and a surface of the first side portion defined between the first end and a point where the first wing portion contacts the first side portion.

20. The bracket of claim 7, wherein the base portion, the first side portion, and the second side portion are integrally formed as a one-piece construction.

* * * * *